F. S. FLOETER.
LATHE.
APPLICATION FILED AUG. 2, 1920.

1,420,987.

Patented June 27, 1922.

Frederick S. Floeter INVENTOR

BY

Geo. B. Willcox ATTORNEY

UNITED STATES PATENT OFFICE.

FREDERICK S. FLOETER, OF SAGINAW, MICHIGAN.

LATHE.

1,420,987.  Specification of Letters Patent.  Patented June 27, 1922.

Application filed August 2, 1920. Serial No. 400,718.

*To all whom it may concern:*

Be it known that I, FREDERICK S. FLOETER, a citizen of the United States, residing at Saginaw, in the county of Saginaw and State of Michigan, have invented certain new and useful Improvements in Lathes; and I do hereby declare the following to be a full, clear, and exact description of the invention, such as will enable others skilled in the art to which it appertains to make and use the same.

This invention relates to turning lathes and pertains more particulary to that class of turning lathes adapted to shape an article, as a crank-shaft pin, by alternately applying a cutting tool, first to one side and then to the other side of the revolving work, there being a cutting tool located in front of the work and another tool located on the opposite side of the work, the two tools being thrown into working contact alternately, one tool advancing toward the work while the other simultaneously recedes.

The object of my present invention is to provide means for rapidly retracting one tool from the work at the end of its cut and for bringing the other tool quickly into engagement with the work.

Heretofore in turning lathes of this character it has been necessary to draw back the cutting tool at the end of its cut, then to move the tool bodily in a direction opposite the direction of the feed, re-enter it into the work and then start the second cut.

My present improvement, however, avoids the necessity of drawing back each tool independently and returning it to its initial position at the end of each cut; and my improvement also provides means whereby the tool on the opposite side of the work is rapidly brought in to engagement with the work at the point of beginning of the second cut, this movement being accomplished while withdrawing the first tool.

With the foregoing and certain other objects in view which will appear later in the specification, my invention comprises the devices described and claimed.

Referring to the drawings, Fig. 1 is a perspective view, broken away in parts, showing the front or working side of a crank-shaft lathe embodying my improvement.

Figure 1:
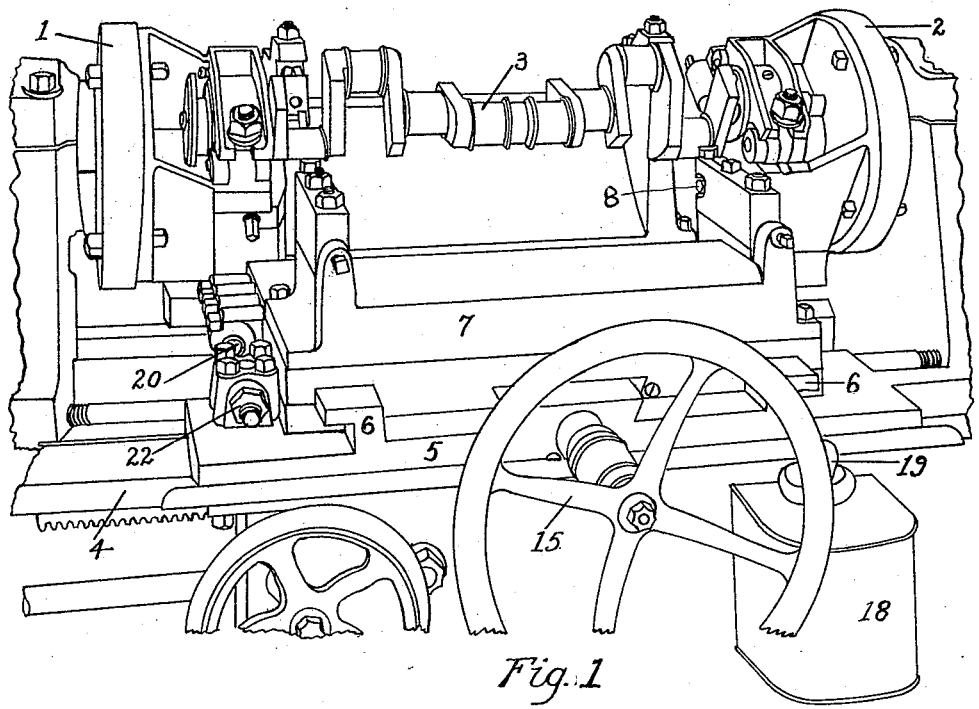

As is clearly shown in the drawings, the device consists in the usual head stock 1 and the tail stock 2, in which is mounted the crank-shaft 3, or similar piece of work. The lathe-bed 4 carries a longitudinally movable table 5, on which are cross guides 6 carrying a transversely movable tool-carrying slide 7.

Upon the tool-carrying slide are secured a tool 8 located at the front of the work 9 and a tool 10 at the rear of the work.

To the under side of the slide 7 is secured a threaded nut 11, through which runs the screw 12. The screw 12 is carried by a forward thrust bearing 13 and a rear bearing 14, both mounted upon the table 5. A hand-wheel 15 serves to turn the screw 12 when it is desired to manipulate the tools 8 and 10 by hand.

It is an object of my invention, as has been previously noted, to provide means for quickly and accurately moving the tools 8 and 10 toward and from the work 9, and to accomplish this purpose I provide an additional means for operating the screw 12 independent of the hand-wheel 15, and this mechanism will now be described.

Upon the transversely movable slide 7, or upon an extension thereof, I mount a motor 16 connected by means of reduction gearing 17 to the screw 12.

Current to the motor is controlled by means of a starting box 18 having a control handle 19, by which the direction of rotation of the motor 16 can be controlled by the operator. The wiring connections not being a part of my present invention, are omitted for sake of clearness.

When the motor 16 is revolved in one direction, tool 8 will approach the work 9 and when the direction of the motor is reversed, tool 10 will approach the work 9 from the opposite side and the tool 8 will be retracted thereby.

Figure 2:
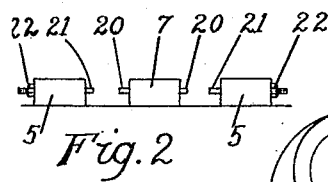
Fig. 2 is a diagrammatic view showing the relation of the stops on the carriage with respect to the stops on the frame, whereby the motion of the tools toward and from the work is limited.
Figure 3:
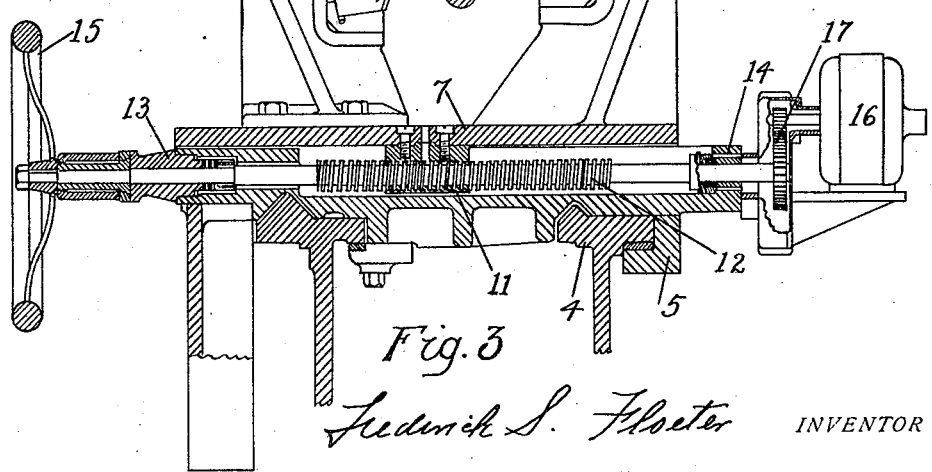
Fig. 3 is a side view of a pair of tool-holders of slightly different shape from those of Fig. 1, the view being partly in cross section to show the mechanism by which the tool holders are moved toward and away from the work.

To limit the transverse movement of the tools 8 and 10 I provide on the transverse carriage 7, as shown diagrammatically in Fig. 2, a pair of projections or stops 20, 20, and similarly on the table 5 I provide corresponding stops or projections 21, 21. These stops 21 are adjustable by means of adjusting nuts 22, or their equivalents.

By means of the stops 20, 21 the transverse movement of the tools is automatically controlled, the slide 7 is brought to a stop and the screw 12 ceases to rotate because the motor 16 becomes stalled.

The motor 16 is preferably of such power that the force which it can generate is only slightly greater than the force required to move the slide and the tools. Consequently the motor, being stalled only temporarily, is not endangered by overheating.

The motor and gears 17 being mounted on the slide 7, are always in proper relation to the screw 12 and do not require to be adjusted in position.

To move the tool 8 up to the work, it is only necessary to turn the switch 19 and the motor rapidly spins the screw until the stop 20 comes nearly into engagement with the stop 21. The operator then releases the switch handle, thereby allowing the switch 18 to open and stop the motor. The operator then slowly feeds the carriage by hand to the desired position, i. e., when the stop 20 engages the stop 21. The carriage and tool are then held in proper relation to the work. Similarly, throwing the control handle 19 in the opposite direction will bring the tool 10 into engagement with the work.

Neither of the above described operations of the motor interfere with the usual operation of the hand-wheel.

Having thus described my invention, what I claim and desire to secure by Letters Patent is:

1. In a turning lathe, the combination of a carriage, a transversely movable tool-carrying slide on said carriage, oppositely disposed tools on said slide, a screw mounted on said carriage and operatively connected to said slide, a motor mounted on said carriage and traveling therewith, said motor geared to the screw, a projection on said transverse slide and adjustable stops on said carriage, whereby to stop the transverse movement of the slide.

2. In a lathe, the combination of a carriage, a transversely movable slide on said carriage, a screw rotatably mounted on said carriage and operatively connected to said slide, a motor mounted on said carriage and connected to said screw, said motor adapted to actuate said screw to rapidly move the lathe tools toward and from the work.

In testimony whereof, I affix my signature in presence of two witnesses.

FREDERICK S. FLOETER.